US008675614B2

(12) United States Patent
Kuehner

(10) Patent No.: US 8,675,614 B2
(45) Date of Patent: Mar. 18, 2014

(54) METHODS AND APPARATUS FOR COMMUNICATING SUBSCRIBER CONTROL PACKETS IN A TRUNKED RADIO SYSTEM

(75) Inventor: Nathanael P. Kuehner, Rolling Meadows, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 99 days.

(21) Appl. No.: 13/339,511

(22) Filed: Dec. 29, 2011

(65) Prior Publication Data

US 2013/0170475 A1    Jul. 4, 2013

(51) Int. Cl.
*H04J 3/00* (2006.01)
(52) U.S. Cl.
USPC ............................................. 370/336
(58) Field of Classification Search
None
See application file for complete search history.

(56) References Cited

U.S. PATENT DOCUMENTS

| 5,276,905 A * | 1/1994 | Hurst et al. ................. 455/435.2 |
| 6,272,117 B1 * | 8/2001 | Choi et al. ..................... 370/330 |
| 2004/0176094 A1 * | 9/2004 | Kim et al. ...................... 455/438 |
| 2010/0240369 A1 * | 9/2010 | Law et al. ...................... 455/436 |

* cited by examiner

*Primary Examiner* — Chi Pham
*Assistant Examiner* — Kouroush Mohebbi
(74) *Attorney, Agent, or Firm* — Daniel R. Bestor

(57) ABSTRACT

Embodiments include a trunking site base station receiving a first base station control packet over a network and, in response, transmitting a first subscriber control packet over a subscriber control channel at a first transmission time that is determined based on a transmission schedule. The first subscriber control packet includes a frame sync, a network ID, and a payload. Responsive to determining that a second base station control packet has not been received before a first timeout (or based on another trigger), the base station transmits a second subscriber control packet at a second transmission time that is determined based on the transmission schedule. The second subscriber control packet includes the frame sync and the network ID. The second subscriber control packet also may include a payload indicating a delay period for a subscriber radio to wait before making an attempt to register with a different trunking site.

24 Claims, 5 Drawing Sheets

METHODS AND APPARATUS FOR COMMUNICATING SUBSCRIBER CONTROL PACKETS IN A TRUNKED RADIO SYSTEM

FIELD OF THE DISCLOSURE

The present disclosure relates generally to methods and apparatus for communicating subscriber control packets in a trunked radio system, and more particularly to methods and apparatus for handling subscriber control packet communication during periods of time when a base station of a trunked radio system is isolated from the control infrastructure.

BACKGROUND

In a trunking site of a trunked radio system, each base station of a group of base stations provides a channel (e.g., a distinct transmit/receive frequency pair or timeslots on a distinct transmit/receive frequency pair) with which the base station may communicate with a population of subscriber radios. During normal operation, one of the base stations of the trunking site (referred to below as a "control channel base station") provides a broadcast control channel, while the other base stations provide bearer (traffic) channels. Although the control channel base station may be changed from time to time, only one base station at a time is typically assigned to be the control channel base station.

Once registered with a trunking site, a subscriber radio continuously monitors the control channel in order to receive regularly-transmitted subscriber control packets from the control channel base station. In addition, the subscriber radio may request communication on a specific talkgroup over the control channel. When such a request is granted, the control channel base station provides the subscriber radio with the frequencies (transmit and receive) and possibly the timeslot(s) corresponding to the bearer channel assigned to the talkgroup. The subscriber radio may then switch to that bearer channel. When the subscriber radio's inclusion in the talkgroup is completed, the subscriber radio returns to monitoring the control channel broadcast by the control channel base station.

In a trunked radio system that implements a "simulcast" trunking site, the group of base stations that provides the control and bearer channels is essentially replicated one or more times, where each instantiation of a base station group may be referred to as being included in a "sub-site." Each control and bearer channel provided by corresponding base stations in the multiple sub-sites is carried on an identical frequency pair, and the corresponding base stations across the sub-sites for each channel transmit identical data packets substantially synchronously. This typically results in constructive interference of the data packets received by the subscriber radios (i.e., the power is summed at the subscriber radio). With such constructive interference, the subscriber radio is oblivious as to whether a single base station has transmitted a data packet or multiple corresponding base stations have synchronously transmitted the same data packet. Accordingly, to the subscriber radio, transmissions from corresponding base stations of a simulcast trunking site appear to be transmissions from a single base station of a non-simulcast trunking site, although the received signals from a simulcast trunking site likely appear to be of higher power.

In both non-simulcast and simulcast trunked radio systems, a subscriber radio that is monitoring a control channel expects to receive subscriber control packets from the control channel base station(s) on a fairly regular basis. The subscriber control packet payloads include a variety of information that is useful in achieving robust system operation. For example, the subscriber control packet payloads may include location information, lists of frequency pairs defining channels provided by the trunking site, and lists of frequency pairs defining control channels for other trunking sites that provide service in a geographical area (i.e., "neighboring" or "adjacent" trunking sites), among other things.

Each subscriber radio monitors the radio frequency (RF) signal conditions of the control channel of the trunking site with which the subscriber radio is currently registered (the "current trunking site"), and also occasionally samples the RF signal conditions of other control channels provided by any neighboring trunking sites of which the subscriber radio is aware. When the RF conditions for the current trunking site fall outside of acceptable ranges or when the subscriber radio fails to receive a subscriber control packet within a certain time period from receiving a last subscriber control packet, the subscriber radio may leave the current trunking site and attempt to register with a neighboring trunking site.

In a simulcast trunking site, the multiple base stations of the various sub-sites are connected to a control infrastructure that is configured to ensure the simultaneous communication of information by corresponding base stations of the various sub-sites, among other things. For example, the control infrastructure sends control messages (referred to below as "base station control packets") to the control channel base stations, which indicate launch times for the control channel base stations to transmit the subscriber control packets, along with the payloads to be transmitted in the subscriber control packets. Because simultaneous transmission is particularly important in a simulcast trunking site, when a particular control channel base station does not receive a base station control packet indicating a launch time for a next subscriber control packet (e.g., when the control channel base station becomes isolated from the control infrastructure for some reason), the control channel base station simply refrains from transmitting a subscriber control packet. In a simulcast trunking site, this avoids potential destructive interference that may otherwise result from unsynchronized transmissions with the other control channel base stations of that trunking site.

The above-described protocol typically provides robust and seamless communication between a group of subscriber radios and the trunking sites with which they communicate. However, in certain situations, multiple ones (e.g., up to all) of the control channel base stations of a simulcast trunking site may become isolated from the control infrastructure and thus may abruptly stop transmitting subscriber control packets. In response to their failure to receive an anticipated subscriber control packet in adequate time (or of sufficient RF quality), the subscriber radios that are registered with that current trunking site may "scatter" to neighboring trunking sites (i.e., abandon the current trunking site and attempt to register with a neighboring trunking site).

When the control infrastructure recognizes that a base station isolation event is imminent and the control infrastructure has sufficient time to react, the control infrastructure may mitigate the situation. For example, during normal operation, a trunking site's registration hold off timer (which affects the timing of incoming registration requests) is zero. To mitigate an upcoming base station isolation event, the control infrastructure may instruct neighboring trunking sites to adjust their registration hold off timers to non-zero values. A typical trunking site is able to handle only a small number of registration requests per second. Accordingly, adjustment of a neighboring trunking site's hold off timer to a non-zero value enables the trunking site to stagger the timing of registration requests that may be received from a group of scattering subscriber radios.

However, when the control infrastructure is not able to recognize an imminent base station isolation event or to react in sufficient time (e.g., by instructing the neighboring trunking sites to adjust their hold off timers), the scattering subscriber radios may overwhelm the neighboring trunking sites with registration requests. Besides the service interruptions experienced by the scattering subscriber radios, the flood of registration requests may interfere with the neighboring trunking sites' ability to service subscriber radios that are currently registered with the neighboring trunking sites. Accordingly, sufficiently-persistent or unanticipated isolation of control channel base stations from the network infrastructure may result in widespread service interruptions with many subscriber radios. Such widespread service interruptions may take a significant period of time to overcome (e.g., many seconds or minutes). Therefore, there is a need for methods and apparatus for more responsively and robustly responding to control channel base station isolation from a control infrastructure.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
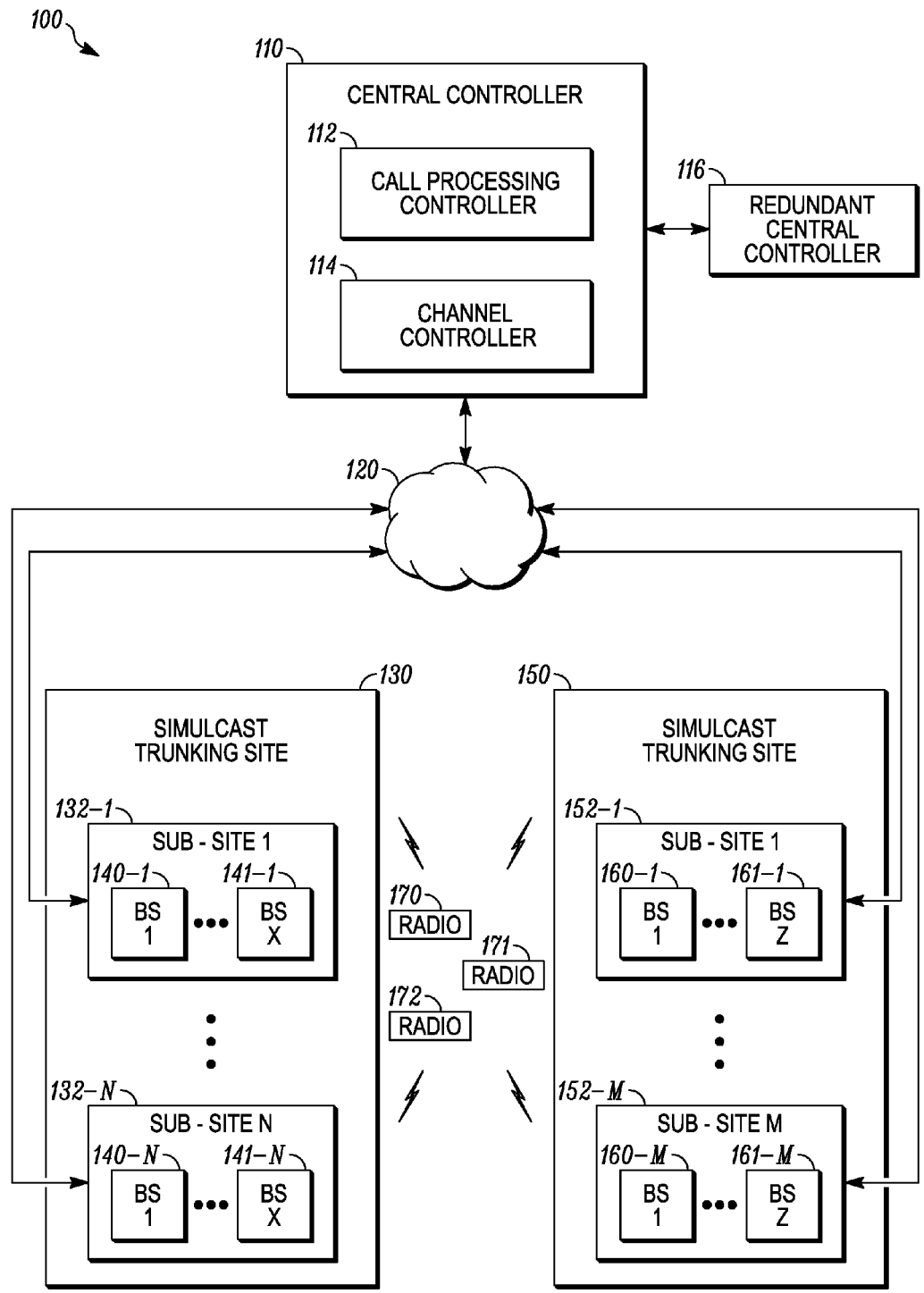
FIG. 1 is a simplified block diagram of a simulcast trunked radio system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Embodiments are implemented in a trunked radio system in which the potential is present for a control channel base station to become permanently or temporarily isolated from a control infrastructure. A control channel base station may be considered to have become "isolated" from a control infrastructure (or an "isolation event" may be considered to have occurred) when the control channel base station has not received a message from the control infrastructure, which would be intended to invoke the control channel base station to transmit a subscriber control packet at a specific launch time (e.g., according to a particular transmission schedule). These messages from the control infrastructure are referred to herein as "base station control packets."

The various embodiments include methods and apparatus for communicating subscriber control packets between a control channel base station and subscriber radios in the face of a control channel base station isolation event. More specifically, the various embodiments provide methods and apparatus for handling control channel base station isolation from a control infrastructure, and implementation of the embodiments may reduce the potential for widespread service interruptions when such base station isolation events occur. Implementation of the various embodiments may delay subscriber radio abandonment of a trunking site when a control channel base station isolation event occurs, thus providing the system with an opportunity to recover from the isolation event (e.g., where recovery occurs when the control channel base station receives a subsequent base station control packet from the control infrastructure). Other embodiments enable a control channel base station that has experienced an isolation event to inform subscriber radios registered with the trunking site of a non-zero registration hold off timer for a neighboring trunking site, which is particularly advantageous in the event that the control infrastructure does not have sufficient time to instruct the neighboring trunking sites to adjust their registration hold off timers to non-zero values. The various embodiments reduce the likelihood that a base station isolation event will cause a large number of scattering subscriber radios to overwhelm neighboring trunking sites with registration requests, thus potentially causing widespread service interruptions that take a significant period of time to overcome. As will be explained in detail below, the various embodiments may be used in systems that implement a control infrastructure that includes a variable delay communication network, such as an Internet protocol (IP) based network (i.e., a network that implements TCP/IP (Transmission Control Protocol/Internet Protocol)). By using the various embodiments in such a system, requirements for tightly controlling the timing of network communications may be relaxed, and a wider variety of types of networks may be used to provide communications for the control infrastructure.

FIG. 1 is a simplified block diagram of a simulcast trunked radio system 100, in accordance with some embodiments. System 100 includes a central controller 110, a simulcast trunking site 130, and a plurality of subscriber radios 170, 171, 172, according to an embodiment. In addition, system 100 may include one or more additional simulcast trunking sites (e.g., simulcast trunking site 150) and/or one or more non-simulcast trunking sites (not illustrated). In the description below, the first simulcast trunking site 130 could be considered to be an example of a "current trunking site" with which the plurality of subscriber radios 170-172 are initially registered, and the second simulcast trunking site 150 could be considered to be an example of a "neighboring trunking site" with which one or more of the subscriber radios 170-172 may register if they are to leave the first simulcast trunking site 130. It is to be understood that the illustration and description of a system with two simulcast trunking sites 130, 150 is for purposes of example and explanation only, and that a trunked radio system may include fewer or more (i.e., one or more than two) simulcast trunking sites and/or one or more non-simulcast trunking sites (not illustrated). In addition, although only three subscriber radios 170-172 are illustrated in FIG. 1, system 100 may include significantly more (e.g., tens, hundreds, or thousands) of subscriber radios 170-172 communicating with any of the simulcast trunking sites 130, 150 and/or non-simulcast trunking sites of the system.

The first simulcast trunking site 130 includes a number, N, of sub-sites 132-1 to 132-N, where N may be an integer from 1 to 20 (or some other number), for example. Each of the N sub-sites 132-1 to 132-N of the first simulcast trunking site 130 includes a number, X, of base stations 140-1 to 141-1 and 140-N to 141-N, where X may be an integer from 2 to 10 (or some other number), for example. Essentially, the N sub-sites 132-1 to 132-N are duplicates of each other, in that each of the N sub-sites 132-1 to 132-N includes a same number of base stations 140-1 to 141-1 and 140-N to 141-N, and corresponding base stations 140-1 to 141-1, 140-N to 141-N of each of the N sub-sites 132-1 to 132-N provide control and bearer channels using the same frequency pairs. More particularly, corresponding base stations 140-1 to 141-1 and 140-N to 141-N across the sub-sites 132-1 to 132-N associated with each channel transmit identical data packets substantially synchronously over the air interface (e.g., to subscriber radios 170-172). As discussed previously, this typically results in constructive interference of the data packets received by the subscriber radios 170-172.

During normal operation, one of the base stations 140-1 to 141-1 and 140-N to 141-N of each sub-site 132-1 to 132-N functions as a control channel base station for the subscriber radios 170-172. For example, corresponding base stations 140-1 to 140-N (designated as "BS 1" in each sub-site 132-1 to 132-N) may, at a particular time, function as current control channel base stations. In the description below, the "control channel base stations" for trunking site 130 will be collectively designated with the numeral "140," for purposes of clarity and conciseness. Throughout the description below, other sets of corresponding base stations that simultaneously provide a particular channel also will be referred to collectively with a simple numeral (e.g., "141," "160," and "161"), as well.

It is to be understood that the current control channel base stations may change from time to time (e.g., to base stations 141-1 to 141-N, or to another set of corresponding base stations across the sub-sites 132-1 to 132-N). Typically, only one base station 140 in each sub-site 132-1 to 132-N at a time is assigned to be a control channel base station. The other base stations of the sub-sites 132-1 to 132-N (e.g., base stations 141-1 to 141-N, which are designated as "BS X" in each sub-site 132-1 to 132-N) provide bearer (traffic) channels over which the subscriber radios 170-172 may communicate with each other (e.g., in the context of talkgroups, data groups, multicast groups, broadcast groups, etc.).

Similar to the first simulcast trunking site 130, the second simulcast trunking site 150 includes a second number, M, of sub-sites 152-1 to 152-M, where M also may be an integer from 1 to 20 (or some other number), and M may or may not be equal to N. Again, each of the M sub-sites 152-1 to 152-M may include a number, Z, of base stations 160-1 to 161-1 and 160-M to 161-M, where Z may be an integer from 2 to 10 (or some other number), for example. The sub-sites 152-1 to 152-M and base stations 160-1 to 161-1 and 160-M to 161-M may provide control and bearer channels in a manner analogous to that described above in conjunction with the description of the first simulcast trunking site 130. However, the frequency pairs assigned to the base stations 140-1 to 141-1 and 140-N to 141-N of the first simulcast trunking site 130 are different from the frequency pairs assigned to the base stations 160-1 to 161-1 and 160-M to 161-M of the second simulcast trunking site 150. Accordingly, the control channel base stations 140 of the first simulcast trunking site 130 communicate with the subscriber radios 170-172 using a different frequency pair from the control channel base stations (e.g., base stations 160-1 to 160-M, designated as "BS 1" in sub-sites 152-1 to 152-M) of the second simulcast trunking site 150. For purposes of clarity, the below discussion focuses primarily on subscriber radio 170-172 communication with the control channel base stations 140 of the first trunking site 130. At times, reference may be made to the subscriber radios 170-172 monitoring the RF conditions associated with the control channel base stations of the second trunking site 150 (referred to collectively as control channel base stations 160, for example purposes), and/or attempting to switch to receiving the control channel provided by control channel base stations 160 by registering with the second trunking site 150.

Control channel base stations 140 provide a broadcast control channel over which a variety of control-related information may be exchanged. For example, in response to receiving a base station control packet over a control infrastructure (e.g., a control infrastructure that includes network 120 and central controller 110), each control channel base station 140 may transmit a subscriber control packet over the air interface (e.g., to subscriber radios 170-172). Those subscriber radios 170-172 that are registered with the first trunking site 130 will continuously monitor the control channel provided by the control channel base stations 140 in order to receive regularly-transmitted subscriber control packets from the control channel base stations 140. In addition, a subscriber radio 170-172 may request communication on a specific talkgroup over the control channel. When such a request is granted, the control channel base stations 140 provide the subscriber radio 170-172 with the frequencies (transmit and receive) and possibly the timeslot(s) corresponding to a bearer channel assigned to the talkgroup. The subscriber radio 170-172 may then switch to that bearer channel, possibly switching communication to another set of corresponding base stations of the first simulcast trunking site 130 (e.g., to base stations 141-1 to 141-N). When the subscriber radio 170-172 has completed its communication with the talkgroup, the subscriber radio 170-172 returns to monitoring the control channel broadcast by the control channel base stations 140.

As indicated above, the central controller 110 and the network 120 over which the central controller 110 communicates with the trunking sites 130, 150 may be considered to be the "control infrastructure" for the system 100. In an alternate embodiment, the control functionality may be distributed, rather than being implemented in a centralized manner in a central controller 110. In such an embodiment, the control functionality may be performed by one or more sub-sites 132-1 to 132-N or base stations 140-1 to 140-N and 141-1 to 141-N that communicate over a network (e.g., network 120 or some other network). For example, but not by way of limitation, the functionality of channel controller 114 may be distributed with at least one instance per RF channel (e.g. per set of corresponding base stations 140, 141, 160, 161). Distribution of other control functionalities could be performed, as well. Accordingly, the sub-sites 132-1 to 132-N, base stations 140-1 to 140-N and 141-1 to 141-N, and the network over which they communicate may be considered to be the "control infrastructure" for the system 100. Although the description below discusses a centralized control function (i.e., implemented using a central controller 110 and a network 120), the scope of the disclosed subject matter is intended to include embodiments implemented in a system with a distributed control function that communicates with the various sub-sites 132-1 to 132-N, 152-1 to 152-M of the system's trunking sites 130, 150 over a network (e.g., network 120 or some other network).

According to an embodiment, central controller 110 includes a call processing controller 112 and a channel controller 114 (although controllers 112, 114 may be implemented in a distributed manner, in an alternate embodiment). The call processing controller 112 is tasked with coordinating calls amongst all of the different trunking sites 130, 150. For example, among other things, the call processing controller 112 is configured to receive call requests from subscriber radios 170-172 (via trunking sites 130, 150) and to provide call grants to the subscriber radios 170-172 (via trunking sites 130, 150), in response.

The channel controller 114 is configured to coordinate simultaneous transmissions by corresponding base stations 140, 141, 160, 161 across multiple sub-sites 132-1 to 132-N, 152-1 to 152-M of each simulcast trunking site 130, 150, among other things. Essentially, the channel controller 114 is tasked with keeping transmissions from sets of corresponding base stations 140, 141, 160, 161 substantially synchronized. For example, communications from channel controller 114 to base stations 140 enable base stations 140 to transmit the same transmission bits at the same time in order to promote constructive interference of the signals transmitted by the corresponding base stations 140, and to attempt to avoid destructive interference of the transmitted signals. Channel controller 114 similarly communicates with other sets of corresponding base stations (e.g., base stations 141, 160, 161) to ensure that transmissions from each set of corresponding base stations is synchronized within the set. According to a particular embodiment, the channel controller 114 is configured to send base station control packets to each set of corresponding base stations 140, 141, 160, 161 over the network 120. In this manner, sets of corresponding base stations 140, 141, 160, 161 receive base station control packets (among other things) from the control infrastructure of the system 100.

The channel controller 114 provides a continuous stream of base station control packets on an intermittent or periodic basis. For example, during normal operation, the channel controller 114 may provide a base station control packet about once every 25 milliseconds (ms) or at some other frequency. As used herein, the frequency at which the control infrastructure (e.g., channel controller 114, FIG. 1) provides base station control packets is referred to as the "base station control packet transmission frequency," and the time period between transmission of regularly scheduled base station control packets (i.e., the inverse of the base station control packet transmission frequency) is referred to as the "base station control packet transmission period."

As will be discussed in more detail below, due to the nature of network 120, a control channel base station 140 may not receive base station control packets in as periodic a manner as the packets were transmitted. More particularly, the network 120 may be of a type that sequentially transmitted packets from one network node to another (e.g., from channel controller 114 to a base station 140, 141, 160, 161) may take different amounts of time in transit. In addition, the network 120 may be of a type that transient network failures may commonly occur, which may or may not trigger routing changes between the network nodes. In other words, rather than implementing circuit switched network communications as has been done in other conventional systems, embodiments of system 100 may include a variable transit time over a packet switched network. For example, as mentioned above, the network 120 may be an IP based network (i.e., a network that implements TCP/IP). Accordingly, network 120 may include the Internet, a network based on an Ethernet standard (e.g., Metro Ethernet or some other network), and/or any of a variety of other types of packet switched networks.

One particular class of base station control packets has a format that includes a payload field and a "launch time" field. The channel controller 114 populates the payload field with data that the channel controller 114 would like the control channel base stations 140 to transmit (i.e., over the control channel) to the subscriber radios 170-172 in subscriber control packets. There are numerous types of payloads that the channel controller 114 may instruct the control channel base stations 140 to transmit, including payloads that identify the system, the trunking site, an alternate control channel within the same trunking site, the identities of neighboring trunking sites, control channel frequency pairs in those neighboring trunking sites, and so on.

To ensure simultaneous transmission of the subscriber control packets with the designated payloads, the channel controller 114 populates the "launch time" field of a base station control packet with a future time (e.g., a time that is 50-100 ms (or some other launch time offset) in the future). The launch time indicates an absolute time that each of the control channel base stations 140 should transmit a subscriber control packet with the designated payload. Each of the control channel base stations 140 operate on a common time base (e.g., Global Positioning System (GPS) time), in an embodiment. Accordingly, knowledge of a future launch time enables the control channel base stations 140 to substantially synchronize their subscriber control packet transmissions over the air interface.

The control channel base stations 140 expect to receive the base station control packets at the base station control packet transmission frequency (e.g., about once every 25 ms or at some other frequency). In other words, the known base station control packet transmission frequency at which the channel controller 114 sends out the base station control packets corresponds to an anticipated reception frequency for the base station control packets at the control channel base stations 140.

In conventional systems, a control channel base station does not transmit a subscriber control packet unless the base station receives a corresponding base station control packet with a payload and a launch time. In addition, in a conventional system, when a control channel base station misses several base station control packets in a row without having received an indication that the base station is no longer assigned to provide the control channel, the control channel base station dekeys its carrier. This causes all of the subscriber radios that previously were monitoring that control channel to search for another control channel. More particularly, when a subscriber radio fails to receive a subscriber control packet within a pre-defined timeout period (e.g., in a range of about 0.25 seconds to about 0.5 seconds, or some other period), the subscriber radio briefly attempts to locate a control channel at the same trunking site and, if unsuccessful, attempts to locate a control channel at a neighboring trunking site.

Standard IP routing protocols typically allow multiple seconds (e.g., up to a minute or more) for a route that has been interrupted to repair itself before choosing a new route (i.e., the standard IP routing protocols allow time for the network to repair "transient" network failures). However, because the amount of time that a standard IP protocol allows a route to repair itself may far exceed the amount of time that a control channel base station will wait to dekey its carrier (and the time that a subscriber radio will wait to attempt to locate a new control channel), implementation of standard IP protocols on the network (e.g., network 120) between the call controller and the base stations may initiate frequent subscriber radio scattering events. Accordingly, implementation of standard IP protocols in the control infrastructure of a conventional system has not been done in conventional systems.

Embodiments of the disclosed subject matter enable a trunked radio system (e.g., system 100) to operate more robustly, while allowing the communication protocol of its control infrastructure network (e.g., network 120) to implement reasonably long transient network failure recovery times. For example, embodiments may enable system 100 to work robustly even when a standard IP protocol is implemented in network 120. Although a standard IP protocol may be implemented in network 120, according to an embodiment, a proprietary or other non-standard, packet-switched communication protocol alternatively may be implemented, in other embodiments.

As will be described in more detail below, according to an embodiment, when a control channel base station 140 (or any individual control channel base station 140-1 to 140-N) does not receive a base station control packet from the control infrastructure according to a known reception schedule (i.e., the control channel base station 140 has "missed" one or more base station control packets), the control channel base station 140 may assume that a transient (or worse) network failure has occurred, and accordingly, that the control channel base station has at least temporarily lost communication with the control infrastructure (or has become "isolated" from the control infrastructure). In such an event, the control channel base station 140 may take remedial action that causes subscriber radios 170-172 to continue to monitor the control channel provided by the control channel base station 140 for a longer period of time than they otherwise would in a conventional system. According to an embodiment, each control channel base station 140 may take such remedial action when it has determined that it has missed even a single base station control packet. In an alternate embodiment, each control channel base station 140 may take such remedial action after it has missed several base station control packets (e.g., when it has missed from 2 to 4 base station control packets, or some other number). As will be discussed in more detail below in conjunction with FIGS. 3-5, despite having failed to receive a base station control packet intended to invoke transmission of a subscriber control packet, a control channel base station 140 transmits one or more subscriber control packets with contents that are determined by the control channel base station 140 and according to a transmission schedule that is determined by the control channel base station 140. The contents of the subscriber control packets may be predetermined so as to be the same throughout the set of corresponding control channel base stations 140. These subscriber control packets are referred to herein as "predetermined subscriber control packets."

According to an embodiment, system 100 also may include a redundant (or "backup") central controller 116, which is configured to dynamically maintain knowledge of the system configuration and other information that central controller 110 currently relies upon to control the system 100. In the event that the central controller 110 is unable to provide call processing and/or channel control functionality for any reason, the redundant central controller 116 may step in promptly to resume system control functions. Although such a control transition may take a significant period of time to complete (e.g., up to several seconds or more), implementation of the various embodiments may allow the control transition from the central controller 110 to the redundant central controller 116 to occur while retaining a population of subscriber radios 170-172 at their current control channels, or at one or more alternative (i.e., other potential) control channels at the same trunking site. Accordingly, potential widespread subscriber radio scattering and service disruptions may be avoided by implementing the various embodiments, even in the face of a control function handoff.

As described below in detail, implementation of various embodiments may be carried out primarily by the base stations 140, 141, 160, 161, and the implementation may be transparent to legacy subscriber radios 170-172. This may be desirable in that an existing system may have hundreds or thousands of deployed subscriber radios, and replacement or update of those subscriber radios likely would be extremely expensive and/or burdensome. Implementation of other embodiments may warrant subscriber radio modifications, although those modifications may be carried out with software updates, in most cases.

Figure 2:
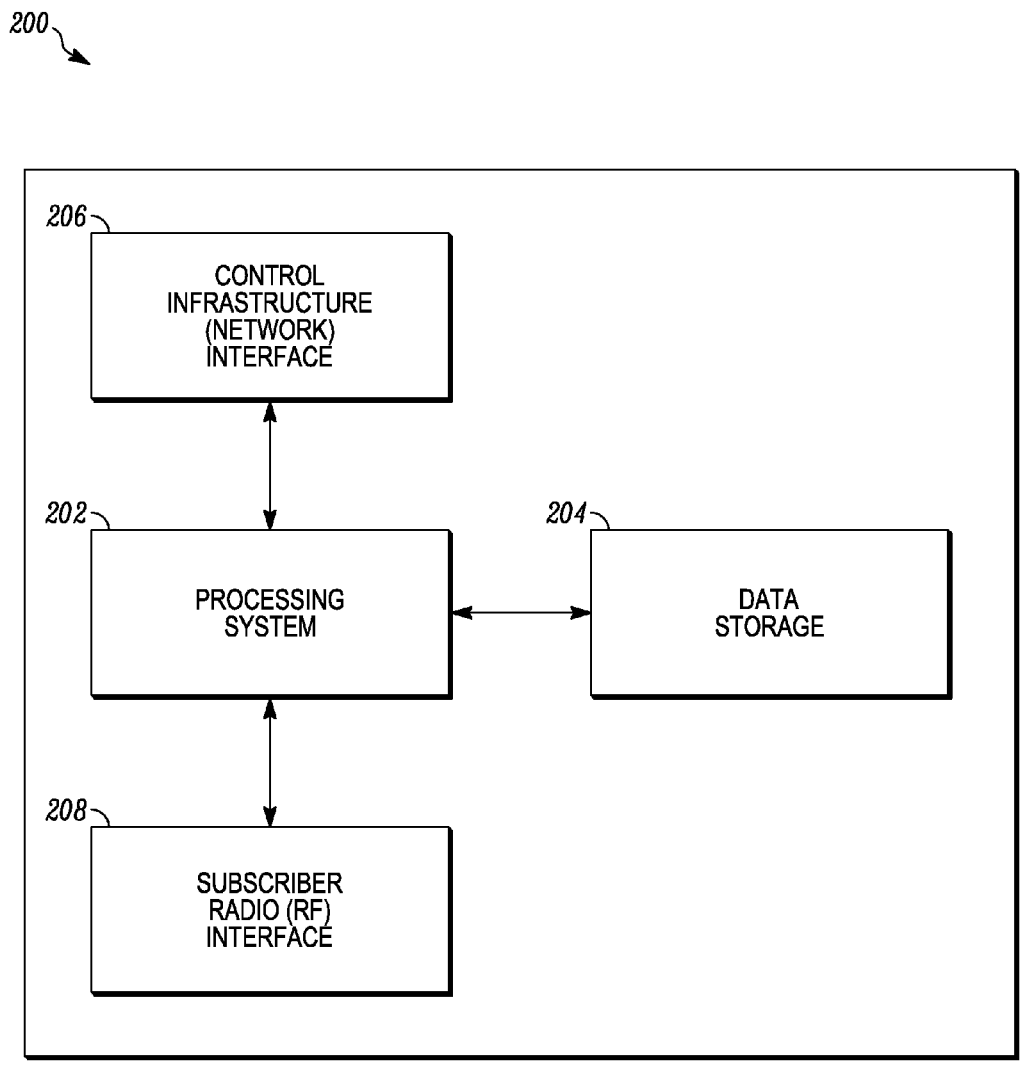
FIG. 2 is a simplified block diagram of a base station of a trunking site, in accordance with some embodiments.

FIG. 2 is a simplified block diagram of a base station 200 of a trunking site or sub-site (e.g., base station 140-1 of sub-site 132, FIG. 1), in accordance with some embodiments. Base station 200 includes a processing system 202, data storage 204, a control infrastructure (network) interface 206, and a subscriber radio (RF) interface 208, according to an embodiment. Control infrastructure interface 206 is configured to enable base station 200 to send and receive link layer packets over the control infrastructure of the system in which base station 200 is incorporated (e.g., over network 120, FIG. 1). Subscriber radio interface 208 is configured to enable base station 200 to send and receive RF signals over the air interface between the base station 200 and a population of subscriber radios (e.g., subscriber radios 170-172, FIG. 1). The control infrastructure interface 206 and the subscriber radio interface 208 may include conventional hardware, firmware, and software, and their structure and functionality are not discussed in detail herein for the purpose of conciseness.

Processing system 202 may include one or more processors and associated hardware, and is configured to implement the various embodiments, as will be discussed in detail in conjunction with FIG. 3, below. Among other functions, processing system 202 is configured to receive (from control infrastructure interface 206) and process incoming base station control packets from the control infrastructure, and to transmit outbound subscriber control packets (via subscriber radio interface 208) to a population of subscriber radios. While performing these and other functions, processing system 202 may maintain various information in data storage 204 (e.g., payloads, launch times, timeout periods, and so on). Embodiments of various methods that may be performed by base station 200 will now be described in conjunction with FIG. 3.

Figure 3:
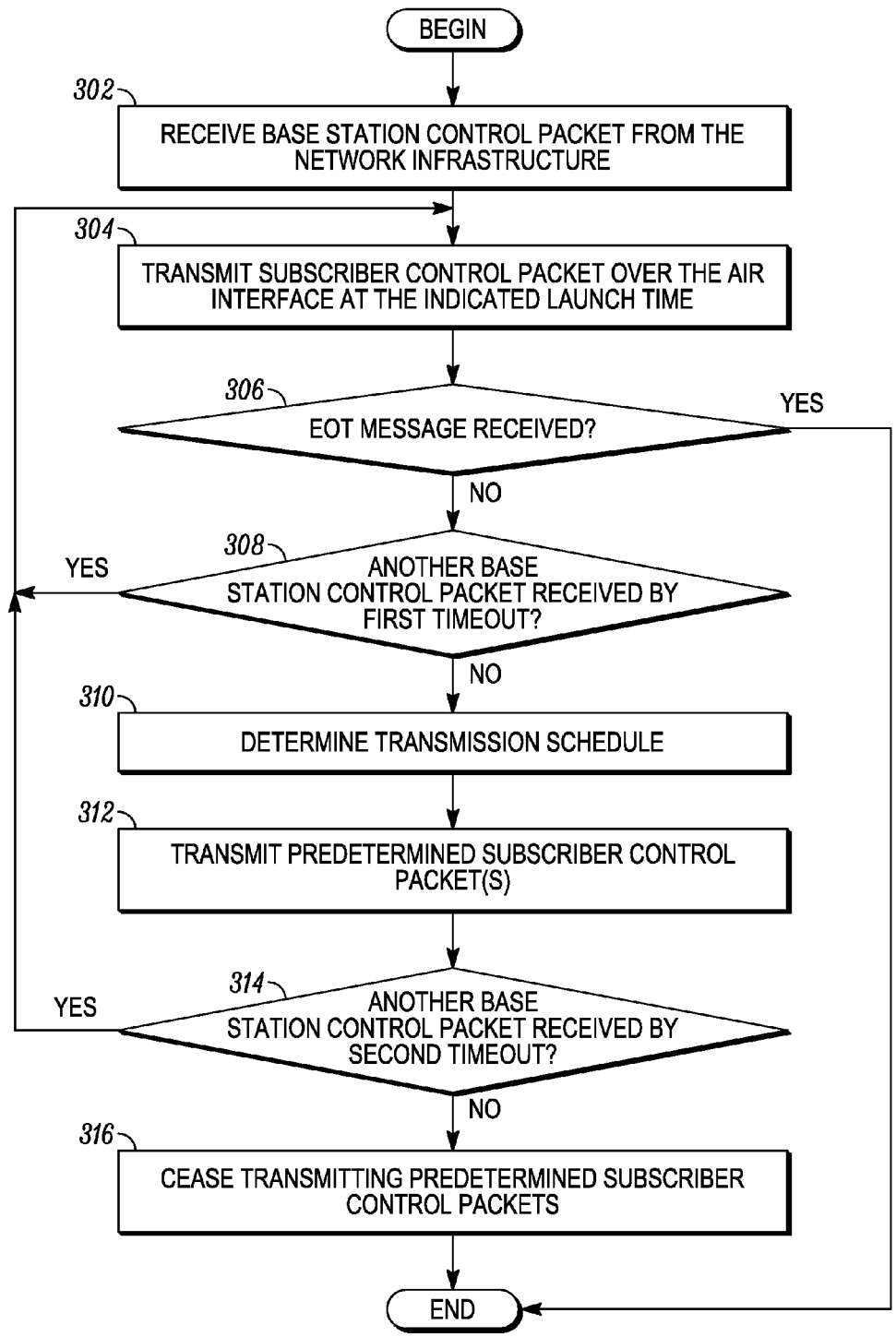
FIG. 3 is a flowchart of a method for a base station to transmit subscriber control packets based on the receipt of inbound base station control packets, in accordance with some embodiments.

FIG. 3 is a flowchart of a method for a control channel base station (e.g., base station 140, FIG. 1) to transmit subscriber control packets based on the receipt of inbound base station control packets, in accordance with some embodiments. The method may be assumed to begin after a particular base station has been assigned and established as a control channel base station. For example, a base station may know that it has been assigned to function as a control channel base station based on the type of packets that the base station receives from the control infrastructure. When the base station receives packets that include payloads that correspond to control channel payloads, the base station may assume that it is assigned to function as a control channel base station. During normal operation, a control channel base station continues to assume that it is assigned to perform control channel functions until it receives an indication from the control infrastructure that it has been de-commissioned from operating as a control channel base station.

Although a control channel base station may have received a number of base station control packets and responsively transmitted corresponding subscriber control packets when an embodiment of the disclosed subject matter is initiated, the description of an embodiment may be assumed to begin, in block 302, when a control channel base station receives a base station control packet from the network infrastructure (e.g., from network 120, FIG. 1). Although the network infrastructure may include a network (e.g., network 120, FIG. 1) and a centralized controller (e.g., central controller 110, FIG. 1) in an embodiment, the network infrastructure alternatively may be configured to perform distributed system control, in other embodiments.

Either way, as discussed previously in detail, the base station control packet may include a payload and a launch time. The launch time indicates a time in the future at which the control channel base station should transmit a corresponding subscriber control packet over the air interface. Accordingly, in block 304, the control channel base station transmits the corresponding subscriber control packet over the air interface at the launch time indicated in the base station control packet.

Figure 4:
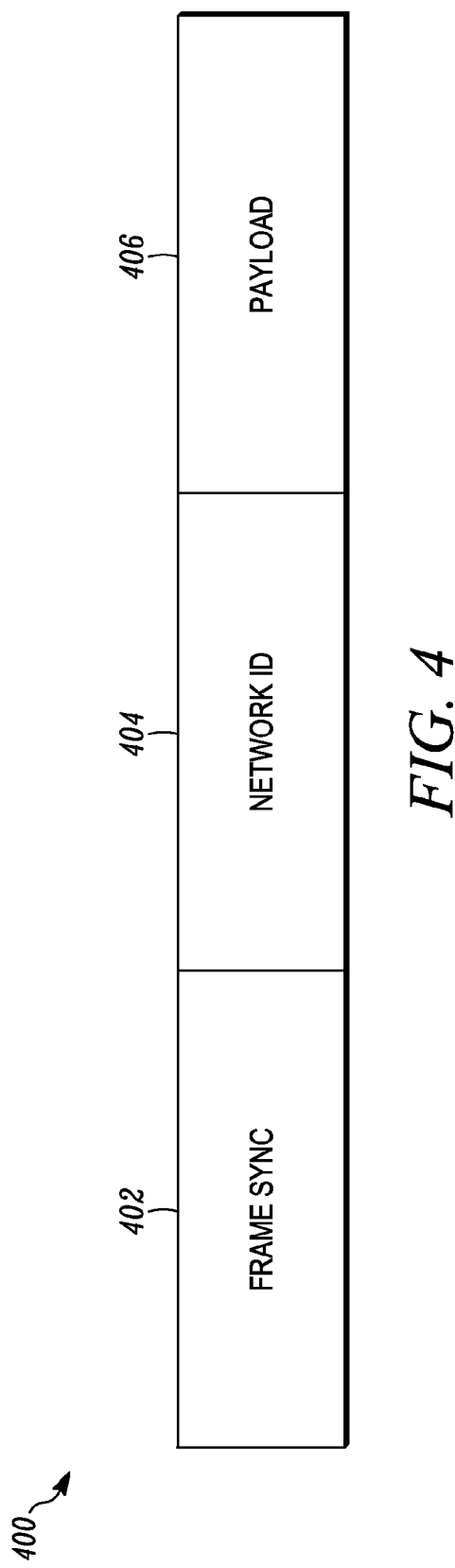
FIG. 4 is a simplified representation of a subscriber control packet, in accordance with some embodiments.

FIG. 4 is a simplified representation of the format of a subscriber control packet 400, in accordance with some embodiments. According to an embodiment, subscriber control packet 400 includes a frame sync field 402, a network ID field 404, and a payload field 406. When populated, the frame sync field 402 conveys a fixed sequence of bits that is known to all the subscriber radios (e.g., subscriber radios 170-172, FIG. 1) that communicate over the system. The bit sequence in the frame sync field 402 enables a subscriber radio to determine that it is receiving a packet, and to synchronize its receiver with the bit stream conveyed in the packet (e.g., using various correlation techniques). The network ID field 404 is populated with a network identifier, which specifies which of a potential plurality of networks (e.g., including a police network, a fire network, and so on) a packet is associated with. For example, a network identifier may include several bits that uniquely identify a particular network. Finally, the payload field 406 may be populated with payload information that a control channel base station transmits in a subscriber control message to subscribers monitoring the control channel.

Referring again to FIG. 3, at any time after having become established as a control channel base station, the base station may receive an indication from the control infrastructure that the base station is no longer to function as a control channel base station. For example, the control infrastructure may transmit an End-Of-Transmission (EOT) message to the control channel base station, to indicate that the control channel base station is being de-commissioned. In block 306, when a determination is made that an EOT message has been received (or some other indication that the control channel base station is being de-commissioned), the method may end.

Otherwise (i.e., when no EOT message has been received), the control channel base station may anticipate that it should receive another regularly-transmitted base station control packet from the control infrastructure. For example, as discussed previously, a control channel base station may anticipate that it should receive base station control packets at the same frequency that the control infrastructure sends out the base station control packets (e.g., about every 25 ms or at some other frequency). As used herein, the frequency at which the control infrastructure (e.g., channel controller 114, FIG. 1) provides base station control packets is referred to as the "base station control packet transmission frequency," and the time period between transmission of regularly scheduled base station control packets (i.e., the inverse of the base station control packet transmission frequency) is referred to as the "base station control packet transmission period."

According to an embodiment, the control channel base station may initiate a "remedial action timer" which, as will be described below, enables the control channel base station to determine whether and when to initiate remedial action in response to any failure to receive base station control packets on a regular basis. For example, the remedial action timer may be initiated (e.g., set to zero for a count-up timer) upon receipt of each base station control packet.

In block 308, the control channel base station determines whether the remedial action timer has reached a first timeout without having received another base station control packet. The first timeout may be a configurable increment of time, which typically should be set to a value that exceeds the period of time between regularly transmitted base station control packets (e.g., the base station control packet transmission period). According to an embodiment, however, the first timeout should not exceed the time at which a subscriber radio would begin searching for a new control channel (referred to as the "subscriber timeout period"), based on the subscriber radio's failure to receive a subscriber control packet within a subscriber-monitored timeout period. For example, if a typical subscriber timeout period is about 0.25 seconds, then the first timeout should not exceed 0.25 seconds, in an embodiment. Accordingly, the first timeout may be in a range of about 25 ms to about 0.25 seconds, in an embodiment. According to another embodiment, the first timeout has a value in a range of about 3 to 6 times the base station control packet transmission period. For example, when the base station control packet transmission period is 25 ms, the first timeout may have a value in a range of about 75 ms to 150 ms. The above given base station control packet transmission periods and subscriber timeout periods are for example purposes only, and those of skill in the art would recognize that the base station control packet transmission periods and subscriber timeout periods may be different from the above-given values. Accordingly, the first timeout may be greater or smaller than the above given ranges.

When the control channel base station has received another base station control packet before the remedial action timer has reached the first timeout, the control channel base station transmits a corresponding subscriber control packet, in block 304, and the method iterates as shown. Conversely, if the control channel base station has not received another base station control packet before the remedial action timer has reached the first timeout, the control channel base station takes remedial action, according to an embodiment. Generally, the remedial action includes transmitting one or more predetermined subscriber control packet(s), which have the effect of delaying abandonment of the control channel by the subscriber radios. As indicated above, according to an embodiment, the trigger for transmitting the predetermined subscriber control packet(s) corresponds to the remedial action timer reaching the first timeout. In other embodiments, other triggers for transmitting the predetermined subscriber control packet(s) may be implemented.

According to an embodiment, in conjunction with transmitting the predetermined subscriber control packet(s), the control channel base station first determines a transmission schedule for transmitting the predetermined subscriber control packet(s), in block 310. According to an embodiment, the transmission schedule specifies one or more future times at which the control channel base station should transmit a predetermined subscriber control packet. According to an embodiment, the transmission schedule (or the one or more future transmission times) is determined based on one or more launch times indicated in one or more previously-received base station control packets. For example, the transmission schedule may be determined by adding the known base station control packet transmission period to the launch time included in the last-received base station control packet. Alternatively, the transmission schedule may be determined by extrapolating from one or more previously-received launch times.

Either way, the transmission schedule specifies one or more transmission times for one or more predetermined subscriber control packets, and the one or more predetermined subscriber control packets are transmitted by the control channel base station in block 312. According to some embodiments, the control channel base station transmits the same predetermined subscriber control packet multiple times (e.g., periodically, based on the transmission schedule), until another base station control packet is received or until expiration of a second timeout, as will be discussed later in conjunction with block 314. According to other embodiments, the control channel base station may transmit one or only a number, P, of predetermined subscriber control packets at transmission time(s) that are dictated by the transmission schedule. For example, P may be a number in a range of about 2 to about 20 (or some other upper value) predetermined subscriber control packets, and P may be predefined or may be selected (e.g., randomly or based on some criteria) from within the range. As will be described in more detail below, a predetermined subscriber control packet according to this latter embodiment may include information in its payload that may mitigate or avoid subscriber radio scattering.

According to an embodiment, each predetermined subscriber control packet has, at least partially, the same packet structure as a regular subscriber control packet (i.e., a subscriber control packet that is transmitted in response to having received a corresponding base station control packet from the control infrastructure). For example, according to an embodiment, each predetermined subscriber control packet includes at least a frame sync field (e.g., frame sync field 402, FIG. 4) and a network ID field (e.g., network ID field 404, FIG. 4). For each predetermined subscriber control packet, the frame sync field and the network ID field are populated with the same frame sync and network ID that are used to transmit regular subscriber control packets. According to an embodiment, when a subscriber radio receives a subscriber control packet (including a predetermined subscriber control packet) with the known frame sync and network ID, that is sufficient to keep the subscriber radio locked onto the control channel, even if the subscriber control packet does not have a standard payload. In other words, receipt of a predetermined subscriber control packet causes the subscriber radio to reset its timer associated with the subscriber timeout period, thus delaying the onset of the subscriber radio abandoning the current control channel and searching for a new control channel.

A predetermined subscriber control packet may be considered also to include a payload field (e.g., payload field 406, FIG. 4). According to an embodiment, the control channel base station may transmit payload bits at a reduced power level (e.g., including a power level as low as zero watts) during a time period that corresponds to transmitting the payload field of the predetermined subscriber control packet. According to another embodiment, the control channel base station may instead refrain from modulating the carrier signal during the time period that corresponds to transmitting the payload field of the predetermined subscriber control packet.

According to yet another embodiment, the control channel base station may include valid information in the payload field of the predetermined subscriber control packet. The information may cause the subscriber radio to take one or more actions. For example, according to an embodiment, the payload field may be populated with information indicating a wait time period for a subscriber radio to continue to monitor the control channel or other alternative control channels at the same trunking site before initiating a search for a control channel at another trunking site, where the wait time period may be longer than the standard subscriber timeout period or may supersede other subscriber criteria for determining when to attempt to find a control channel at another trunking site. The wait time period may be specifically included (or encoded) in the payload field. Alternatively, the payload field may merely include an indicator that the subscriber radio should monitor the subscriber control channel or one or more alternative control channels at the trunking site for a wait time period, where the wait time period already is known to the subscriber radio, or where the wait time period can be determined by the subscriber radio based on other information that already is known to the subscriber radio. If the subscriber radio receives a standard subscriber control packet (i.e., a subscriber control packet that was transmitted by the control channel base station in response to having received a base station control packet from the control infrastructure) within the wait time period, then the subscriber radio remains on the control channel and the system operates normally. Conversely, if the subscriber radio fails to receive a standard subscriber control packet before expiration of the wait time period, the subscriber radio may initiate a search for another control channel.

According to yet another embodiment, the payload field may be populated with information indicating a "superseding random hold off time limit" that a subscriber radio should use to determine a random hold off time before attempting to register with a different (e.g., neighboring) trunking site. The advantages to such an embodiment will be illuminated by a brief description of the concept of hold off time limits implemented in a trunked radio system.

In some trunked radio systems, the control channel base station(s) of each trunking site regularly transmit a message that indicates a random hold off time limit (e.g., an FRHOT (Failure Random Hold Off Timer) message). Prior to a subscriber radio making an attempt to register with a trunking site, the subscriber radio may be required to receive and process the random hold off time limit message on the control channel associated with that trunking site. The random hold off time limit indicates a maximum time period that the subscriber radio should wait before making a registration attempt with the trunking site. When the random hold off time limit has a value of zero, the subscriber radio may make a registration attempt immediately. However, when the random hold off time limit has a non-zero value, the subscriber radio randomly determines a time within the random hold of time limit, and the subscriber radio makes the registration attempt at that random time.

During normal system operation, the random hold off time limit transmitted by the control channel base stations of a system is zero. When the control infrastructure has knowledge that some type of a system failure (e.g., with one of the trunking stations) is imminent, the control infrastructure may send base station control messages to the control channel base stations (e.g., to the control channel base stations of neighboring trunking stations), which indicate that the control channel base stations should set their random hold off time limits to non-zero values. The magnitude of the non-zero values may be specified by the control infrastructure based on a number of subscriber radios that the control infrastructure anticipates to be scattering from a failing trunking station (e.g., the more scattering subscriber radios, the higher the random hold off time limit). This enables neighboring trunking stations to stagger incoming registration requests from scattering subscriber radios.

However, in some situations, the control infrastructure may not have knowledge that a network failure that may invoke a subscriber radio scattering event has occurred, or may not gain such knowledge in time to instruct the neighboring trunking sites to increase their random hold off time limits before the scattering event occurs. These issues with conventional systems may be mitigated by implementing the embodiment briefly mentioned above, in which the payload field of a predetermined subscriber control packet is populated with information indicating a "superseding random hold off time limit." More specifically, in the predetermined subscriber control packet, the superseding random hold off time limit indicates a time limit that a subscriber radio should use to determine a random hold off time before attempting to register with a different (e.g., neighboring) trunking site. The superseding random hold off time limit in the predetermined subscriber control packet supersedes any random hold off time limit indicated in a message from a neighboring trunking site. Accordingly, even if the control infrastructure does not have sufficient time to mitigate a failure by adjusting the random hold off time limits of the various neighboring trunking sites, scattering subscriber radios may implement a non-zero random hold off time that is selected within the superseding random hold off time limit in the predetermined subscriber control packet.

Referring again to FIG. 3, after transmitting one or more predetermined subscriber control packets, in block 314, the control channel base station determines whether the remedial action timer has reached a second timeout without having received another base station control packet, where the second timeout is later than the first timeout. The second timeout indicates a time when the control channel base station considers the communication failure with the control infrastructure to be more than just a transient event, and at which the control channel base station allows the subscriber radios that are registered with the trunking site to attempt to locate different control channels (e.g., control channels provided by neighboring trunking sites).

The second timeout also may be a configurable increment of time, which typically should be set to a value that exceeds the subscriber timeout period (e.g., exceeds 0.25 to 0.5 seconds). According to an embodiment, the second timeout is configured to correspond to a time period that exceeds the duration of typical, transient network failures that may be characteristic of the network communication protocol used by the control infrastructure (e.g., TCP/IP or some other protocol). For example, the second timeout may have a value in a range of about 1 second to about 20 seconds, and more preferably in a range of about 5 seconds to about 10 seconds, although the second timeout may be longer or shorter, as well.

When the control channel base station has received another base station control packet before the remedial action timer has reached the second timeout, the control channel base station transmits a corresponding subscriber control packet, in block 304, and the method iterates as shown. Conversely, if the control channel base station has not received another base station control packet before the remedial action timer has reached the second timeout, the control channel base station may cease transmitting predetermined subscriber control packets, and may dekey its carrier, in block 316. This allows the subscriber radios that are registered with the trunking station to attempt to find another control channel (e.g., a control channel provided by a neighboring trunking site).

The above description has focused on processes performed by a control channel base station. As mentioned previously, some embodiments may be implemented without the necessity to change the functioning of legacy subscriber radios. According to other embodiments, some modifications to subscriber radios may be made. Such embodiments are described from the subscriber radio perspective in conjunction with FIG. 5, which is a flowchart of a method for a subscriber radio to register with a simulcast trunking site and to process received subscriber control packets from base stations in accordance with some embodiments.

The method may begin, in block 502, when a subscriber radio (e.g., one of subscriber radios 170-172, FIG. 1) locates a control channel for a trunking site (e.g., trunking site 130, FIG. 1), and registers with that trunking site. Initially, the subscriber radio may have a list of pre-programmed control channel frequency pairs, and the subscriber radio may attempt to detect subscriber control packets using the transmit frequencies specified in those frequency pairs. Alternatively, the subscriber radio may search one or more bands in order to attempt to detect subscriber control packets at a frequency within the searched band(s).

Either way, once a control channel frequency has been determined, and as mentioned previously, the subscriber radio may first determine a random hold off time at which the subscriber radio will attempt to register, based on a random hold off time limit specified on the control channel by the trunking site. Once registered with the trunking site, the subscriber radio monitors the control channel. For example, as discussed previously, this may include receiving and processing subscriber control packets that have been transferred on roughly a periodic basis by the control channel base station(s) of the trunking site.

As discussed previously, each subscriber control packet includes a frame sync field (e.g., frame sync field 402, FIG. 4) that enables the subscriber radio to detect an incoming subscriber control packet, and to synchronize its receiver with the incoming subscriber control packet. In addition, each subscriber control packet includes a system ID field (e.g., system ID field 404, FIG. 4) that enables the subscriber radio to determine whether the subscriber control packet is relevant to the system in which the subscriber radio is included. In addition, subscriber control packets may include a variety of different messages in a payload field (e.g., payload field 406, FIG. 4). For example, the payload field may include information identifying neighboring trunking sites, frequency pairs for control channels provided by neighboring trunking sites, and a frequency pair for a potential alternate control channel that may later be provided by the current trunking site, among other things. The information indicating frequency pairs for other potential control channels may later be used by the subscriber radio to establish a connection with one of those other control channels, if that becomes necessary.

Figure 5:
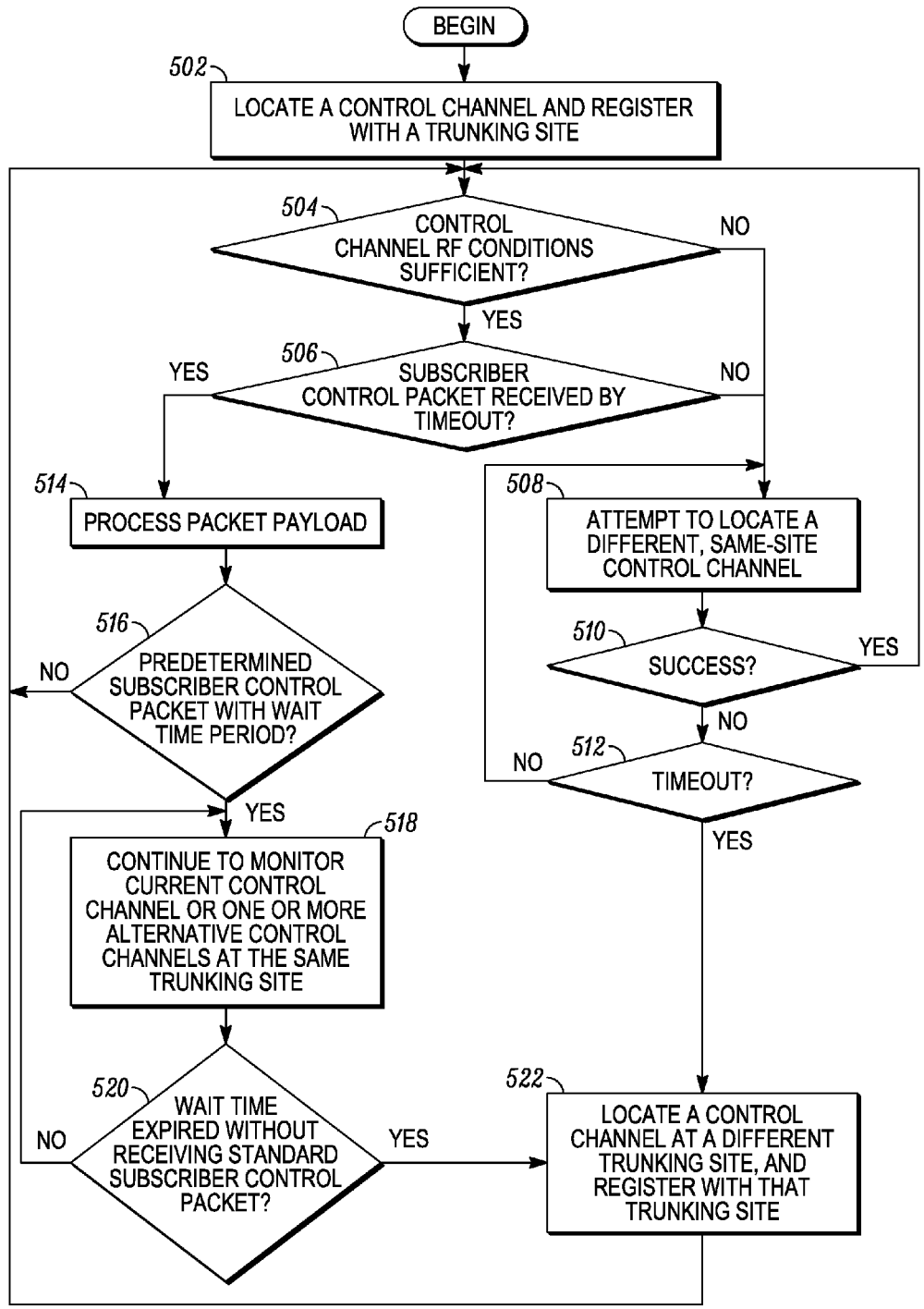
FIG. 5 is a flowchart of a method for a subscriber radio to register with a simulcast trunking site and to process received subscriber control packets from base stations, in accordance with some embodiments.

In block 504, which may be performed periodically and not necessarily in the order indicated in FIG. 5, the subscriber radio may monitor the RF conditions of the control channel to determine if they are sufficient to warrant staying on that control channel. In addition, although not shown in FIG. 5, the subscriber radio may occasionally monitor the RF conditions of the control channels of neighboring trunking sites of which the subscriber radio is aware, and the subscriber radio may maintain (e.g., store in local memory) information indicating the RF characteristics of those control channels for potential later use.

When the RF conditions of the control channel provided by the trunking site with which the subscriber radio is registered are not sufficient to warrant staying on that control channel, in block 508, the subscriber radio briefly may attempt to locate an alternate control channel provided by the same trunking site (e.g., in the event that the trunking site switched the frequency pair for its control channel). If the subscriber radio is successful at locating an alternate control channel provided by the same trunking site, as indicated by block 510, then the subscriber radio may begin monitoring that control channel for incoming subscriber control packets, and the method may iterate as shown. The subscriber radio may continue to attempt to locate an alternate, same-site control channel until expiration of a timeout period, as indicated by block 512. If the subscriber radio is not successful at locating an alternate, same-site control channel prior to the expiration of a timeout period, then the subscriber radio may attempt to locate a control channel at a different (e.g., neighboring) trunking site of which the subscriber radio is aware, in block 522. The subscriber radio may then attempt to register with that trunking site, and, if successful, the method may iterate as shown.

Referring again to block 504, as long as the control channel RF conditions for the control channel remain sufficient, the subscriber radio may continue to monitor the control channel for incoming subscriber control packets. As indicated previously, the subscriber radio may maintain a timer that the subscriber radio may use to determine whether or not it should search for a new control channel, based on a failure to receive a subscriber control packet over the control channel before expiration of a subscriber timeout period. For example, the timer may be reset each time a new subscriber control packet is received over the control channel. When the subscriber radio fails to receive a subscriber control packet prior to expiration of the subscriber timeout period, as indicated by block 506, the subscriber unit may attempt to locate another control channel, as previously discussed in conjunction with blocks 508, 510, 512, 520, and 522.

According to an embodiment, subscriber control packets may include conventional subscriber control packets and predetermined subscriber control packets, such as those previously discussed. Either way, when a new subscriber control packet has been received prior to expiration of the subscriber timeout period, the subscriber radio may process the packet payload (if any) in block 514. Processing of standard packet payloads is not discussed in detail herein.

When a subscriber radio receives a predetermined subscriber control packet that was transmitted with a power-suppressed payload or using an unmodulated carrier, the predetermined subscriber control packet may appear to have no payload, and the subscriber radio may simply ignore the packet (e.g., and return to blocks 504, 506). Conversely, as discussed previously, another embodiment of a predetermined subscriber control packet may include information indicating a wait time period for the subscriber radio to continue to monitor the current control channel before initiating a search for another control channel. When the subscriber radio has received a predetermined subscriber control packet that includes such a wait time period, as indicated by block 516, the subscriber radio may continue to monitor the current control channel for a standard subscriber control packet, in block 518, until expiration of the wait time. If the wait time expires prior to the subscriber radio receiving a standard subscriber control packet (e.g., a subscriber control packet that is based on the control channel base station having received a base station control packet from the control infrastructure), as indicated by block 520, then the subscriber radio may attempt to locate a control channel at a different (e.g., neighboring) trunking site of which the subscriber radio is aware, in block 522. The subscriber radio may then attempt to register with that trunking site, and, if successful, the method may iterate as shown.

According to another embodiment, and as discussed previously, the payload field of a predetermined subscriber control packet may be populated with information indicating a superseding random hold off time limit that a subscriber radio should use to determine a random hold off time before attempting to register with a different (e.g., neighboring) trunking site. Although not illustrated in FIG. 5, when a predetermined subscriber control message is received with a superseding random hold off time limit, the subscriber radio may determine a random hold off time from the superseding random hold of time limit, and may attempt to register with a control channel of a neighboring trunking site at the random hold off time. According to another embodiment, the subscriber radio may determine a random hold off time based on the larger of the superseding random hold off time limit and a random hold off time limit that is indicated in a subscriber control packet from the neighboring trunking site (e.g., an FRHOT message). Once registered with the neighboring trunking site (e.g., block 522), the method may iterate as shown.

Embodiments of methods and apparatus for communicating subscriber control packets in a trunked radio system have been described above. An embodiment includes a method performed by a base station of a trunking site within a trunked radio system. The method includes receiving a first base station control packet over a network and, in response to receiving the first base station control packet, transmitting a first subscriber control packet over a subscriber control channel at a first transmission time that is determined based on a transmission schedule. The first subscriber control packet includes a frame sync, a network ID, and a payload based on the first base station control packet. The method also includes determining that a second base station control packet has not been received over the network before a first timeout and, in response to determining that the second base station control packet has not been received before the first timeout, transmitting a second subscriber control packet over the subscriber control channel at a second transmission time that is determined based on the transmission schedule. The second subscriber control packet includes the frame sync and the network ID.

Another embodiment includes a method performed by a base station of a trunking site within a trunked radio system. The method includes transmitting a predetermined subscriber control packet over a subscriber control channel at a first transmission time that is determined based on a transmission schedule. The predetermined subscriber control packet includes a frame sync, a network ID, and a first payload with information indicating that a subscriber radio should monitor the subscriber control channel or one or more alternative control channels at the trunking site for a wait time period.

Another embodiment includes a method performed by a subscriber radio that communicates over a subscriber control channel with one or more base stations of a trunking site within a trunked radio system. The method includes receiving a first subscriber control packet from the trunking site on the subscriber control channel. The first subscriber control packet includes a frame sync, a network ID, and a payload field with information indicating a delay period for the subscriber radio to wait before making an attempt to register with a different trunking site. The method also includes determining how to make the attempt to register with the different trunking site based on the information indicating the delay period.

An embodiment of a trunked radio system includes a trunking site including one or more base stations. Each base station of the one or more base stations is configured to receive a first base station control packet over a network and, in response to receiving the first base station control packet, to transmit a first subscriber control packet over a subscriber control channel at a first transmission time that is determined based on a transmission schedule. The first subscriber control packet includes a frame sync, a network ID, and a first payload based on the first base station control packet. Each base station of the one or more base stations is further configured to determine that a second base station control packet has not been received over the network before a first timeout and, in response to determining that the second base station control packet has not been received before the first timeout, to transmit a second subscriber control packet over the subscriber control channel at a second transmission time that is determined based on the transmission schedule. The second subscriber control packet includes the frame sync and the network ID.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method performed by a base station of a trunking site within a trunked radio system, the method comprising:
    receiving, at the base station, a first base station control packet from an infrastructure controller over a network;
    in response to receiving the first base station control packet, the base station transmitting a corresponding first subscriber control packet over a subscriber control channel at a first transmission time that is determined based on a transmission schedule, wherein the first subscriber control packet includes a frame sync, a network ID, and a payload based on the first base station control packet;
    determining, by the base station, that a second base station control packet has not been received from the infrastructure controller over the network within a threshold period of time from a time at which the first base station control packet was received; and
    in response to determining that the second base station control packet has not been received before the first timeout, the base station generating and transmitting a pre-determined subscriber control packet, configured to cause subscriber radios receiving the pre-determined subscriber control packet to delay abandonment of the subscriber control channel, over the subscriber control channel at a second transmission time that is determined based on the transmission schedule.

2. The method of claim 1, further comprising:
determining the transmission schedule based on two or more launch times indicated in two or more previously-received base station control packets.

3. The method of claim 1, further comprising:
periodically transmitting the pre-determined subscriber control packet over the subscriber control channel at two or more subsequent transmission times based on the transmission schedule.

4. The method of claim 3, further comprising:
determining that the second base station control packet has not been received over the network before a second timeout; and
in response to determining that the second base station control packet has not been received by the second timeout, discontinuing periodically transmitting the pre-determined subscriber control packet.

5. The method of claim 1, further comprising:
determining that the second base station control packet has been received over the network before a second timeout; and
in response to determining that the second base station control packet has been received by the second timeout, transmitting a third subscriber control packet that includes the frame sync, the network ID, and a second payload based on the second base station control packet.

6. The method of claim 1, wherein the pre-determined subscriber control packet includes a payload field, and wherein the base station transmits the pre-determined subscriber control packet at a reduced power level during a time period that corresponds to transmitting the payload field of the pre-determined subscriber control packet.

7. The method of claim 1, wherein the pre-determined subscriber control packet includes a payload field, and wherein the base station refrains from modulating a carrier signal during a time period that corresponds to transmitting the payload field of the pre-determined subscriber control packet.

8. The method of claim 1, wherein the pre-determined subscriber control packet includes a second payload with information indicating a wait time period for the subscriber radios to delay abandoning the subscriber control channel.

9. The method of claim 1, wherein the pre-determined subscriber control packet includes a second payload with information indicating a superseding random hold off time limit that the subscriber radios should use to determine a random hold off time before abandoning the subscriber control channel and attempting to register with a different trunking site, wherein the superseding random hold off time limit supersedes a previous random hold off time at the subscriber radios.

10. The method of claim 1, wherein the pre-determined subscriber control packet includes the same frame sync and network ID as the first base station control packet.

11. The method of claim 1, wherein the transmission schedule is a simulcast transmission schedule set by the infrastructure controller for a plurality of base stations in the trunking site.

12. A method performed by a base station of a trunking site within a trunked radio system, the method comprising:
generating, at the station, and transmitting, by base station, a predetermined subscriber control packet over a subscriber control channel at a first transmission time that is determined based on a transmission schedule determined via prior control packets received at the base station from an infrastructure controller, wherein the predetermined subscriber control packet includes a frame sync, a network ID, and a first payload and configured to cause subscriber radios receiving the pre-determined subscriber control packet to delay abandonment of the subscriber control channel for a wait time period.

13. The method of claim 12, further comprising:
determining the transmission schedule based on two or more launch times indicated in two or more base station control packets that the base station previously received over a network from the infrastructure controller.

14. The method of claim 12, wherein the transmission schedule is a simulcast transmission schedule set by the infrastructure controller for a plurality of base stations in the trunking site.

15. A method performed by a subscriber radio that communicates over a subscriber control channel with one or more base stations of a trunking site within a trunked radio system, the method comprising:
receiving, at the subscriber radio, a first subscriber control packet from the trunking site on the subscriber control channel, wherein the first subscriber control packet includes a frame sync, a network ID, and a payload field and configured to cause subscriber radios receiving the pre-determined subscriber control packet to delay abandonment of the subscriber control channel; and
responsively delaying, by the subscriber radio, any further attempts to register with different trunking sites based on information indicating a wait time period for at least the wait time period, and instead continuing to monitor the subscriber control channel.

16. The method of claim 15, wherein the payload field indicates the wait time period.

17. The method of claim 16, wherein the wait time period is set to a value greater than a configured time when the subscriber radio otherwise would have made the attempt to register with the different trunking site if the first subscriber control packet had not been received.

18. The method of claim 15, wherein the payload field includes information indicating a superseding random hold off time limit that the subscriber radio should use to determine a random hold off time before attempting to register with the different trunking site, wherein the superseding random hold off time supersedes a previous random hold off time limit at the subscriber radio, and
the method further comprising:
attempting, by the subscriber radio, to register with the different trunking site upon expiration of the random hold off time.

19. A trunked radio system comprising:
a trunking site including one or more base stations, wherein each base station of the one or more base stations is configured to:
receive a first base station control packet from an infrastructure controller over a network,
in response to receiving the first base station control packet, transmitting a corresponding first subscriber control packet over a subscriber control channel at a first transmission time that is determined based on a transmission schedule, wherein the first subscriber control packet includes a frame sync, a network ID, and a first payload based on the first base station control packet, determine that a second base station control packet has not been received from the infrastructure controller over the network within a threshold period of time from a time at which the first base station control packet was received, and in response to determining that the second base station control packet has not been received before the first timeout, generate and transmit a pre-determined subscriber control packet, configured to cause subscriber radios receiving the pre-determined subscriber control packet to delay abandonment of the subscriber control channel, over the subscriber control channel at a second transmission time that is determined based on the transmission schedule.

20. The trunked radio system of claim 19, wherein the trunking site is a simulcast trunking site with a plurality of sub-sites, the one or more base stations includes a plurality of base stations, and the plurality of base stations are included in the plurality of sub-sites, and wherein the transmission schedule is a simulcast transmission schedule.

21. The trunked radio system of claim 19, wherein the pre-determiner subscriber control packet includes a payload field, and wherein each base station of the one or more base stations is configured to transmit the pre-determined subscriber control packet at a reduced power level during a time period that corresponds to transmitting the payload field.

22. The trunked radio system of claim 19, wherein the pre-determined subscriber control packet includes a payload field, and wherein each base station of the one or more base stations is configured to refrain from modulating a carrier signal during a time period that corresponds to transmitting the payload field.

23. The trunked radio system of claim 19, wherein the pre-determined subscriber control packet includes a second payload with information indicating a superseding random hold off time limit that a subscriber radio should use to determine a random hold off time before attempting to register with a different trunking site, wherein the superseding random hold off time supersedes a previous random hold off time limit at the subscriber radio.

24. The trunked radio system of claim 20, wherein each base station of the one or more base stations is further configured to:

determine the simulcast transmission schedule based two one more launch times indicated in one or more previously-received base station control packets.

* * * * *

UNITED STATES PATENT AND TRADEMARK OFFICE
CERTIFICATE OF CORRECTION

PATENT NO. : 8,675,614 B2  
APPLICATION NO. : 13/339511  
DATED : March 18, 2014  
INVENTOR(S) : Kuehner Page 1 of 1

It is certified that error appears in the above-identified patent and that said Letters Patent is hereby corrected as shown below:

On the title page in the Figure, delete " 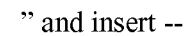 " and insert -- 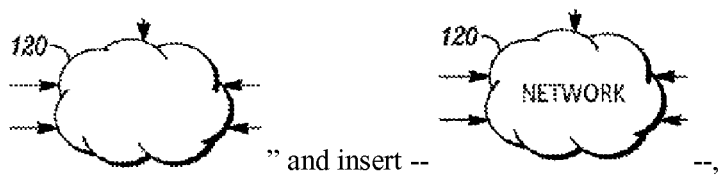 --, therefor.

In the drawings

In Fig. 1, Sheet 1 of 5, delete " 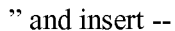 " and insert -- 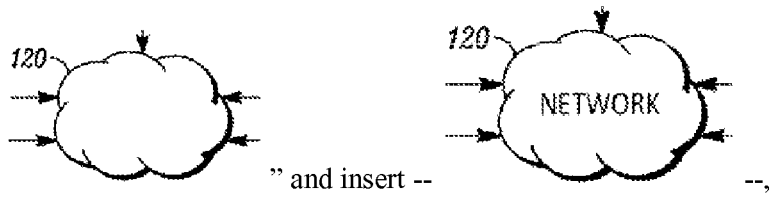 --, therefor.

In the claims

In Column 21, Line 57, in Claim 9, delete "time at" and insert -- time limit at --, therefor.

In Column 23, Line 25, in Claim 21, delete "pre-determiner" and insert -- pre-determined --, therefor.

In Column 24, Lines 22-23, in Claim 24, delete "based two one more" and insert -- based on two or more --, therefor.

Signed and Sealed this  
Tenth Day of May, 2016

Michelle K. Lee  
*Director of the United States Patent and Trademark Office*